United States Patent
Brandt, Jr.

(10) Patent No.: US 10,288,473 B2
(45) Date of Patent: May 14, 2019

(54) WEIGHT MEASUREMENT BY FLEXURE SUPPORT

(71) Applicant: Robert O. Brandt, Jr., Wilmington, NC (US)

(72) Inventor: Robert O. Brandt, Jr., Wilmington, NC (US)

( * ) Notice: Subject to any disclaimer, the term of this patent is extended or adjusted under 35 U.S.C. 154(b) by 166 days.

(21) Appl. No.: 15/253,076

(22) Filed: Aug. 31, 2016

(65) Prior Publication Data

US 2018/0058912 A1    Mar. 1, 2018

(51) Int. Cl.
*G01G 23/01*    (2006.01)

(52) U.S. Cl.
CPC ..................... *G01G 23/01* (2013.01)

(58) Field of Classification Search
CPC ..... G01G 21/23; G01G 13/247; G01G 13/248
See application file for complete search history.

(56) References Cited

U.S. PATENT DOCUMENTS

| | | | | |
|---|---|---|---|---|
| 3,822,866 A * | 7/1974 | Daester | ............... | B01F 15/0445 366/8 |
| 4,004,647 A * | 1/1977 | Forst | ................... | B60P 3/10 177/128 |
| 4,490,077 A * | 12/1984 | Shimada | ............... | G01F 1/74 406/124 |
| 5,262,598 A * | 11/1993 | Stotler | ................. | G01G 13/06 177/116 |
| 5,670,751 A * | 9/1997 | Hafner | ................. | G01G 11/08 177/1 |
| 6,283,327 B1 * | 9/2001 | Rubtsov | ................. | B65G 53/14 222/168 |
| 2004/0002789 A1 * | 1/2004 | Hachtel | ............... | G01G 11/086 700/241 |
| 2009/0294469 A1 * | 12/2009 | Poulain | ................. | G01G 13/00 222/1 |

(Continued)

FOREIGN PATENT DOCUMENTS

DE            3722978 A1 *    1/1989    ........... G01G 13/026

*Primary Examiner* — Natalie Huls
(74) *Attorney, Agent, or Firm* — Daniel Becker; Robert G. Rosenthal

(57) ABSTRACT

A suspended hopper apparatus is adapted to dispense a flowable product. Three supports, a vessel, and a valve mechanism are provided. One of the three supports is a scale-support, and the other two supports are pivot-supports. A scale-support is a support which comprises a scale, wherein the scale is of a type which resists translation in only one direction, and does not resist translation in any lateral direction and wherein the direction is vertically-upward, and resists by providing upward support with respect to the vessel. The pivot-supports are supports which comprise pivots, the pivots resisting translation and are arranged to resist forces that are applied to the apparatus in the lateral direction. The pivots define a common axis of rotation, the axis extends in a horizontal direction and the pivots do not resist rotation about their axis. The vessel has centerline that is offset laterally from its axis and the product has a product centerline that is offset laterally from its axis. The apparatus is arranged such that the valve mechanism does not generate a moment about the axis by its center of mass being located in a vertical plane passing through the axis.

8 Claims, 3 Drawing Sheets

(56) References Cited

U.S. PATENT DOCUMENTS

2015/0308884 A1* 10/2015 Kawanishi ............ G01G 13/00
                                                    177/59
2016/0041027 A1*  2/2016 Dierneder ............. G01G 19/08
                                                    177/136
2018/0058912 A1*  3/2018 Brandt, Jr. ............ G01G 21/23

* cited by examiner

_US 10,288,473 B2_

WEIGHT MEASUREMENT BY FLEXURE SUPPORT

FIELD OF THE INVENTION

This invention relates generally to the field of measurement of particulate materials, and more specifically, to a method and apparatus for weighing a low density particulate in a suspended hopper which data can be used in combination with a feed system to determine material flow rates and hopper refill times.

BACKGROUND OF THE INVENTION

Solid particulate products, such as grain, animal feed (barley, corn, wheat, and animal by-products), cereals, cat litter, and other particulate materials, are normally converted from bulk material into smaller portions for sale. As part of the packaging process, a bulk quantity of product is placed into a hopper. At the exit end of the hopper is a valve that controls the rate of product flow out of the hopper. To accurately and efficiently fill units of such products, manufacturing technologies have developed techniques to continuously monitor product flow.

In some manufacturing processes, it is either necessary or desirable to suspend the hopper from above, and in this case the strict minimum number of scales or load cells required is one, but, if the hopper must be stationary (as many manufacturing processes require), the hopper requires support against translation and rotation in multiple planes, three supports are usually employed, one for each scale.

Employing multiple scales has a number of disadvantages, such as cost, difficulty of installation, and maintenance. In addition, measurement errors may occur as the result of scale miscalibration, or the malfunction of any scale can affect the entire system.

In view of the foregoing, it would be an improvement in the art to provide a scale system for a suspended hopper that employs a single scale.

SUMMARY OF THE INVENTION

The present invention describes several embodiments of a hopper system that employs a single scale, two pivots in place of two of the three scales in three-scale systems of the prior art, and novel arrangement of components which otherwise must be calibrated out of calculations in the prior art systems. Among contemplated embodiments are ones applying flexures in place of pivots, and ones which relocate the valve mechanism such that its center of gravity is aligned directly under the pivots. An excellent cumulative benefit of these embodiments allow the valve mechanism of a typical hopper system to not have to be weighed, so smaller scales are viable for the present invention which could be used with hopper systems of the prior art.

Also, since the flexures take the entire load in the XY plane, the load cell or scale is required to measure in the Z plane only. Because of these benefits, a simple "button" type load cell is viable to be used in embodiments of the present inventions, and it was incapable of enduring such use in suspended hoppers of the prior art. Load cells such as those employed in connection with several embodiments of the present invention, one that do not have to resist side loads, are less expensive and generally more accurate and robust than those which are designed to resist side loadings. The load cell only measures the product and not the heavy fixed load, and a much smoother, higher resolution output is obtained. By employing the derivative of a smooth unfiltered signal, embodiments of the present invention produce a much faster responding signal representative of product flow. An additional benefit of the present system resides in the fact that there is excellent bin level measurement even when the bin is being filled.

Tests on a small hopper of 20 inches in diameter indicated that the center location on fill could easily be held to less than 0.5% on the weight. For continuous flow control, the error is almost insignificant. While a person having ordinary skill in the art would possibly expect that elimination of two scales might cause error in measurement owing to lack of considering a shifting center of mass of a product, practiced embodiments yielded such improvements with respect to resolution of the scale and external force rejection by the flexures as to unexpectedly overwhelm any potential accuracy loss of a non-centered product.

BRIEF DESCRIPTION OF THE DRAWINGS

Some of the features and advantages of the present invention having been briefly described, others will appear from the detailed description which follows, when taken in connection with the accompanying drawings in which.

DETAILED DESCRIPTION OF THE FIGURES

While the present invention will be described more fully hereinafter with reference to the accompanying drawings, in which a particular embodiment is shown, it is to be understood at the outset that a person skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
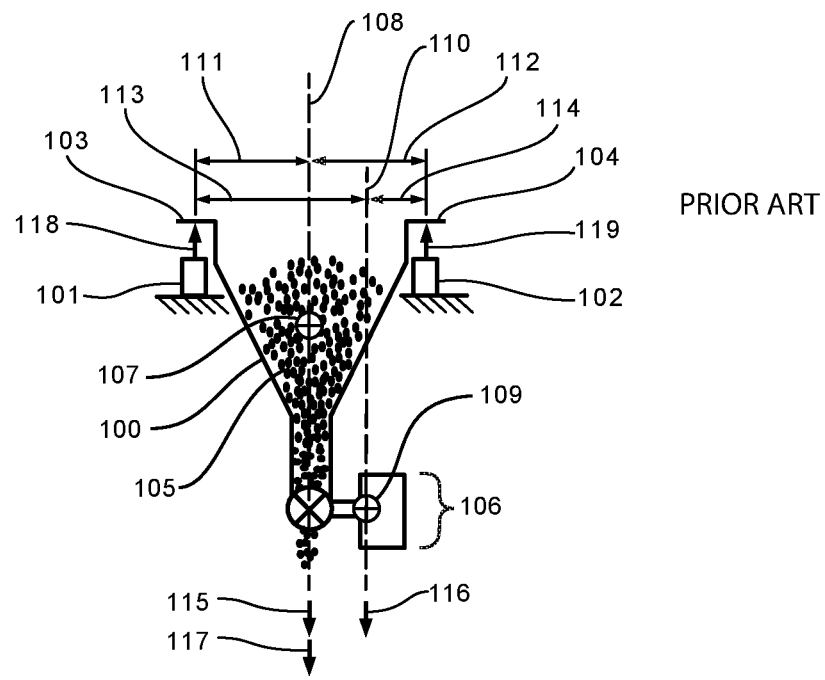
FIG. 1 depicts a side elevation view of theoretical model of a suspended hopper according to the prior art

Referring now to FIG. 1, depicting a mathematical model of a side elevation view of a two support hopper apparatus suspended from two scales(scale 1(101), scale 2(102)), one scale at each respective support (103,104), and filled with a flowable material product (105). There is a valve mechanism (106) disposed at the bottom of the hopper (100), for regulating the flow of the product (105) out of the hopper (100). The product's center of mass (107) is indicated by a product centerline (108). The product weight (115) is a downward force applied to the system on the product mass centerline (108). The valve mechanism (106) comprises a center of mass (109), indicated by a valve mass centerline (110).

The valve weight (116) is a downward force applied to the system on the valve mass centerline (100). The distance from the centerlines (108,110) to each of the respective scales is shown as X1 (111) and X2 (112), the respective distances of scale 1 (101) and scale 2 (102), with respect to the product mass centerline (108), and X3 (113) and X4 (114), the respective distances of scale 1(101) and scale 2(102), with respect to the valve mass centerline (110).

The hopper (100), product (105), and valve mechanism (106) are suspended from the supports (103, 104), with the weight of the hopper (100) being hopper weight (117) distributed equally between both scales. The two scales (101, 102) register measurements according to the following:
ΣF is the sum of the vertical forces on the system, SCALE_1 means the weight force (118) at scale 1 (101), and SCALE_2 means the weight force (119) at scale 2 (102), ΣM=0 is the sum of the Moments on the system, where moments are the product of the forces on the system and the respective moment arm distances of each force with respect to a relative point of reference). For clarity, reference numerals do not appears in the following equations, for: Product_weight (115), Scale_1 (118), Scale_2 (119), Valve_Weight (116), and Hopper_weight (117).
ΣF =0 ("setting the sum of the forces equal to zero") and arrange in terms of Product Weight:

Product_Weight:=SCALE_1+SCALE_2−
Valve_Weight−Hopper_Weight            EQ 1.1

To determine the exact load on each scale (101,102), we must ΣM=0 ("set the sum of the moments equal to zero"), and substitute into EQ 1.1, to result in EQ 1.2 and 1.3.

$$SCALE\_2 := \frac{X1}{X1+X2} * Product\_Weight + \frac{X3}{X3+X4} * Valve\_Weight + \frac{Hopper\_Weight}{2} \quad EQ\ 1.2$$

$$SCALE\_1 := \frac{X2}{X1+X2} * Product\_Weight + \frac{X4}{X3+X4} * Valve\_Weight + \frac{Hopper\_Weight}{2} \quad EQ\ 1.3$$

The sum of $SCALE_1$(11) and $SCALE_2$(119) therefore give the overall weight of the system, from which known values of Valve_Weight (116) and Hopper_Weight (117) are applied, in order to calculate Product_Weight (115), where Product_Weight (115) is the instant value of the weight (105) of the product in the hopper (106).

Accurate calculation of product weight (115) in the mathematical modeling of the theoretical system shown in FIG. 1 requires scales (102, 103) which can withstand weight forces amounting to as much as the combined weight of a large hopper (100), the weight of the product (105) filling that hopper, and the weight of the industrial-scale valve mechanism (106). While the scales (101, 102) estimate such large overall system weights, they must also be so precise as to minimize the possibility of error in incremental and delayed measurement of the changing weight of the product (105) remaining in the hopper (100). The arrangement of FIG. 1 therefore represents an arrangement of such a system that requires very capable equipment, accurate and timely monitoring, and rapid and continuous calculations from multiple sensors. It is rife with opportunities for error. The hopper system shown in FIG. 2 is significantly improved over FIG. 1, with regard to minimization of error.

Figure 2:
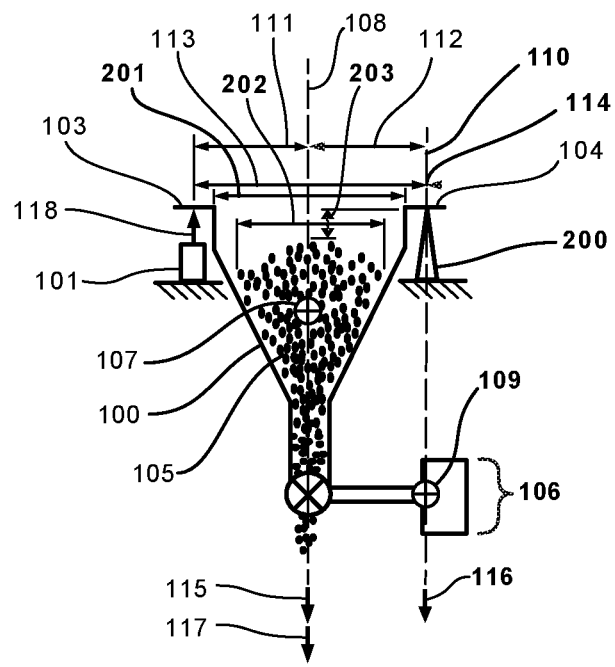
FIG. 2 depicts a side elevation view of a theoretical model of an embodiment of a suspended hopper according to the present invention.

Referring now to FIG. 2, what is shown is a side elevation view of a mathematical model of a suspended hopper (100). In this theoretical embodiment, a pivot (200) replaces scale 2 (102, FIG. 1), and the support (104) is therefore constrained in translation, but no weight measurements are taken. Relative to FIG. 1, the valve mechanism (106) in FIG. 2 is offset to the right, until the valve center of mass (109) is directly under the support 2 (104). In this position, the valve mass centerline (110) is located at the same position as the pivot (200), so X4 (114) collapses to 0.

According to EQ 1.3, the valve weight (116) contributes to Scale_1 (118) in proportion to the ratio of X4 (114) to the sum of X3 (113) and X4 (114). With X4 (114) equal to 0, the proportion of valve weight (116) contributed to Scale_1 (118) also collapses to. As such, the entirety of the valve weight (116) is applied to the support (104).

As in FIG. 1, the product mass centerline (108) is equidistant between scale 1 (101) and support 2 (104), meaning that X1 (111) equals X2 (112).

Therefore, substitution into EQ 1.3 of X1=X2 and X4=0 yields:

$$SCALE\_1 := \frac{1}{2} * Product\_Weight + \frac{Hopper\_Weight}{2} \quad EQ\ 1.4$$

Re arranging in terms of Product Weight (115) gives:

Product_Weight=2SCALE_1−Hopper_Weight            EQ 1.5

In other words, 2× the weight (118) measured by Scale 1 (101), minus the hopper's weight (117) is the product weight (115). Since the valve center of mass (109) has been moved directly under the pivot (200), the valve mechanism (106) does not contribute any fraction of its weight (116) to the force (118) measured at the support (103), as measured by Scale 1 (101).

In contemplated embodiments in which the product center of mass should be in an erroneous position, there are a number of elements that mitigate such error, including:
1. Providing the product (105) to the hopper (100) via a mechanism that discharges in the center of the hopper (100).
2. Making the distance between the supports (103, 104) larger, relative to the hopper width (201).
3. Make the hopper tapered in shape, so that as the level (203) of the product (105) in the hopper (100) decreases, the distance between the supports (the sum of X1 (111) and X2 (112) becomes proportionally larger than the decreasing width (204) of the product (105) at that level (203). As the width (204) of the product (105) narrows, the range of distances that the product center of mass (107) can deviate from the center of the hopper (100).

Referring now to FIGS. 3A-3B and 4A-4B is a hopper (300) of the prior art, suspended on three (3) scales (301, 302, 303), placed around the periphery of the hopper (300). This 3-D method is the current preferred method for suspended hopper weight measurement. For simplicity, the hopper (300) is shown without product (105, FIGS. 1-2) or a valve mechanism (106, FIGS. 1-2).

Whereas FIGS. 1 and 2 arranged all components on a single plane (X-Z), FIGS. 3A, 3B, 4A and 4B address embodiments which locate components on 3 planes (X-Z, X-Y, Z-Y). Compared to the sums of forces and moments in EQ 1.1-1.5, the 3D analysis comprises an extra moment, $M_y$. A1 is the angular offset (from the X axis) to Scale 2 (302), and a2 is the angular offset from the X axis to Scale 1 (301). The distance from Scale 1 (301) to the common center of mass (304) is d1 (305), and respectively d2 (306) and d3 (307) for Scale 2 (302) and Scale 3 (303). In EQS.2.1-2.7, Scale_1 represents the force (308) at Scale 1 (301), Scale_2 represents the force at Scale 2 (302), Scale_3 represents the force (309) at Scale 3 (303). Force (309) is not visible in FIGS. 3A-3B, and Scale 2 (302) is not visible in FIG. 3B.

[$\Sigma F=0$, $\Sigma M_x=0$, and $\Sigma M_y=0$ ] ("setting the sum of the forces and moments equal to zero"):

$$\Sigma M_x = (d1 * \sin(a_1) * SCALE\_1 + d_2 \sin(a_2) * SCALE\_2 + d_3 \sin(a_3) * SCALE\_3) = 0 \qquad \text{EQ 2.1}$$

$$\Sigma M_y = (d1 * \cos(a_1) * SCALE\_1 + d_2 \cos(a_2) * SCALE\_2 + d_3 \cos(a_3) * SCALE\_3) = 0 \qquad \text{EQ 2.2}$$

$$\Sigma F = (SCALE\_1 + SCALE\_2 + SCALE\_3 - Product\_Weight - Hopper\_Weight - Valve\_Weight) = 0 \qquad \text{EQ 2.3}$$

We can thus write the sum of the forces $\Sigma F=0$ as the equation:

$$Product\_Weight = SCALE\_1 + SCALE\_2 + SCALE\_3 - Valve\_Weight - Hopper\_Weight \qquad \text{EQ. 2.4.}$$

Then, by including EQS. 2.2 and 2.3 into EQ 2.4, solving for SCALE_3 (310) (the force at Scale 3 (303)) simplifies to:

$$SCALE\_3 = \left(\frac{d_1 * d_2}{d_1 * d_2 + d_1 * d_3 + d_2 * d_3}\right) * Product\_Weight + \left(\frac{d_1 * d_2}{d_1 * d_2 + d_1 * d_3 + d_2 * d_3}\right) * Hopper\_Weight + \left(\frac{d_1 * d_2}{d_1 * d_2 + d_1 * d_3 + d_2 * d_3}\right) * Valve\_Weight \qquad \text{EQ 2.5}$$

When the total center of mass (304) is centered in the hopper (300), d1 (305), d2 (306) and d3 (307) are all equal to one another. This represents the condition in which all of the masses would be centered between the scales. In that condition, this 3 scale system can be compared to the 2 scale system of FIGS. 1 and 2.

Substituting (d1=d2=d3) into EQ 2.5, yields:

$$SCALE\_3 = \frac{1}{3} * Product\_W + \frac{Hopper\_W}{3} + \frac{Valve\_W}{3} \qquad \text{EQ 2.6}$$

Compared to EQ 1.2, recognizing that the respective divisors of EQNS 1.2 and 2.6 are the respective number of scales, the equations are essentially equivalent to one another (for their distinct arrangements). The exception is that EQN. 2.6, contains a term for Valve_Weight. To eliminate the term containing Valve_Weight, in order to effect a novel arrangement which alleviates Scale 3 (303) of the burdens of the weight of the valve mechanism (106, FIGS. 1-2), and allow monitoring that does not require calibration to eliminate weight contributed from such a valve, it must be relocated.

Figure 4A:
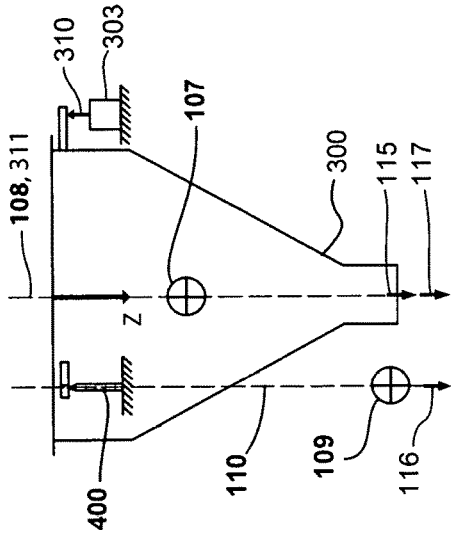
FIG. 4A depicts a plan view of an embodiment of a 3-support suspended hopper according to the present invention.
Figure 4B:
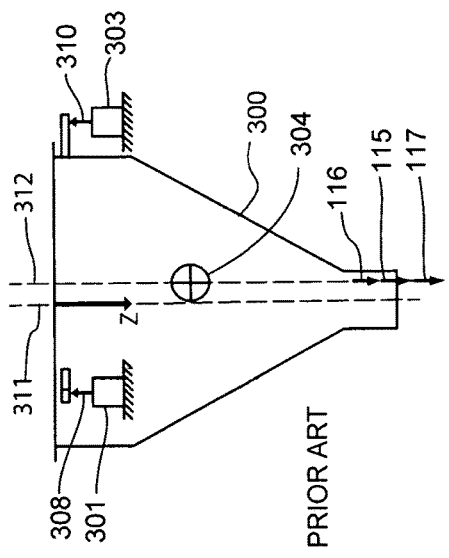
FIG. 4B depicts a side view of an embodiment of a 3-support suspended hopper according to the present invention.
Figure 3A:
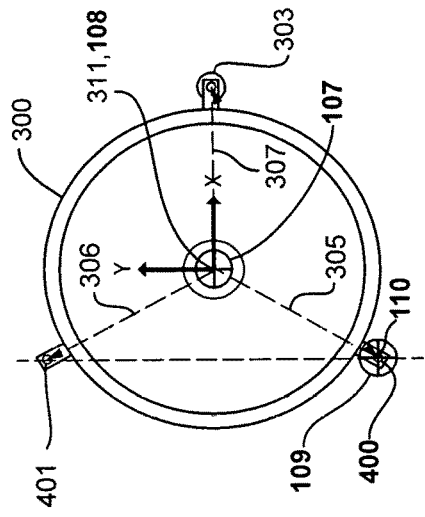
FIG. 3A depicts a plan view of a 3-support suspended hopper according to the prior art.
Figure 3B:
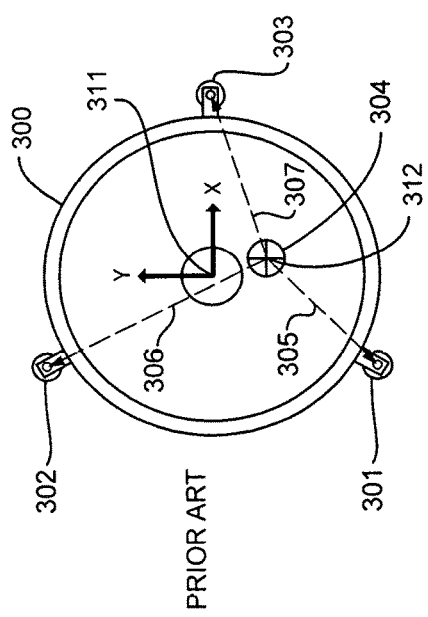
FIG. 3B depicts a side elevation view of a 3-support suspended hopper according to the prior art.

Referring now to FIG. 4, a novel embodiment of a suspended hopper system is shown. Rather than a single Total Center of Mass (304), FIGS. 4A-4B are distinguished from FIGS. 3A-3B by comprising two distinct centers of mass (107 and 109), as was employed in the 2D embodiments (FIGS. 1-2). This embodiment relocates the center of mass (107) of the valve mechanism (106) to directly align with a pivot, Pivot 1 (400).

In this position, if d1 (305) of the valve center of mass (109) equals 0, then it would not be weighed. Note, from EQ 2.5, that only two places exist for d1 (305) (or d2 (306)) for this to occur—exactly over Pivot 1 (400) or Pivot 2 (402). The product center of mass (107) is centered with respect to the three supporting objects, the two Pivots (400,401) and Scale 3 (303).

$$Product\_3 = 3 * SCALE\_3 - 3 * Hopper\_W \qquad \text{EQ. 2.7}$$

Note that changes in any of the centers of mass (107) in the Y-plane will be measured as error by Scale 3 (303), whether it is the product center of mass (107), valve center of mass (109) or hopper (along hopper centerline (311)), because since there is no significant force in the Y plane in this two scale embodiment.

Figure 5A:
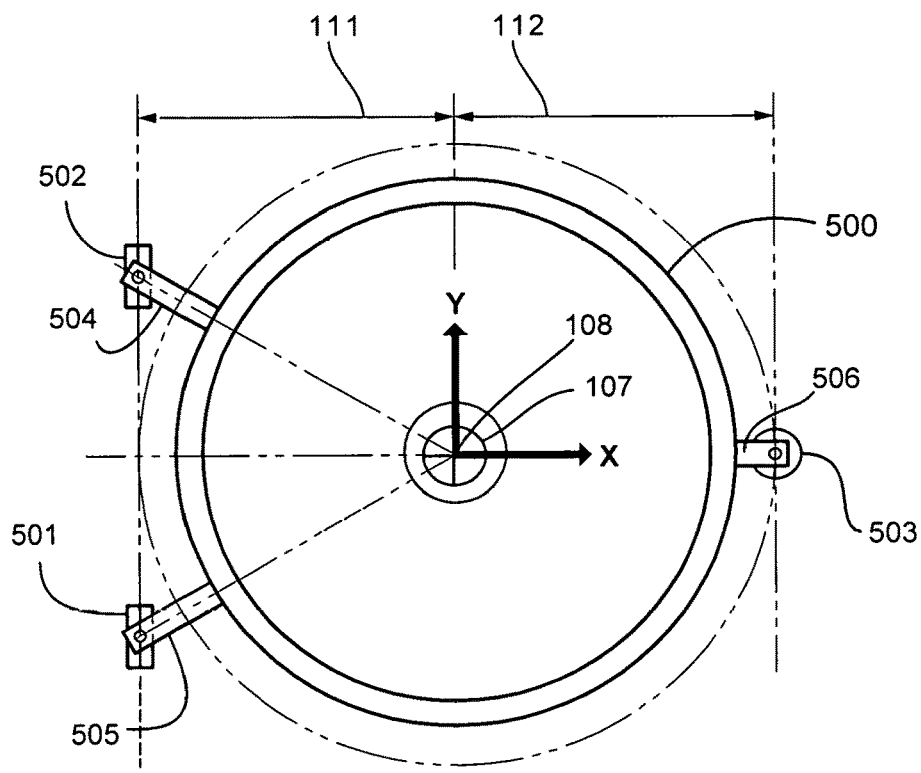
FIG. 5A depicts a plan view of an embodiment of a 3-support suspended hopper according to the present invention.
Figure 5B:
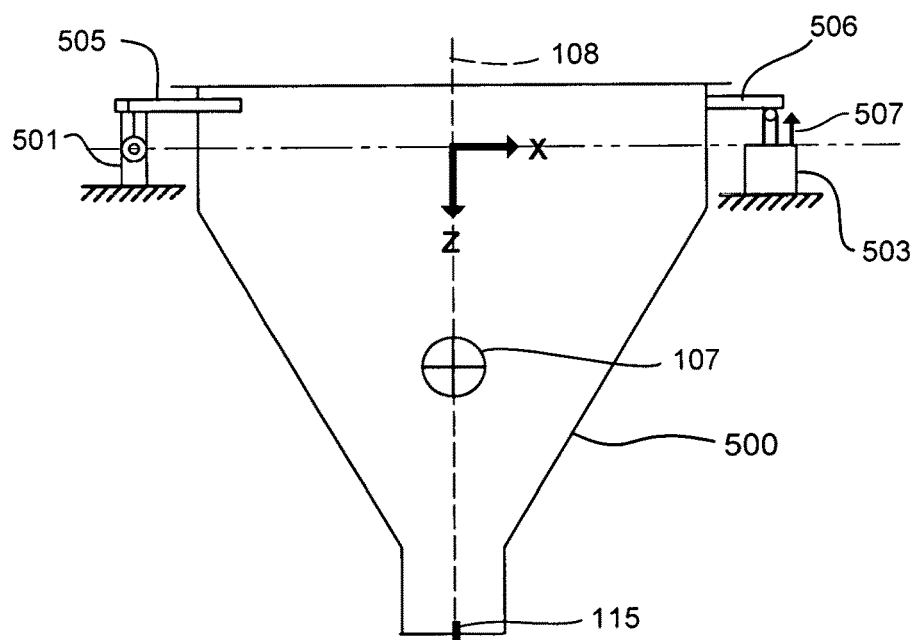
FIG. 5B depicts a side elevation view of an embodiment of a 3-support suspended hopper comprising a scale support and flexure pivot supports according to the present invention.

Referring now to FIGS. 5A-5B, showing views of an embodiment of a 3-support suspended hopper (500). Proportions of significance to details concerning calculation of the location (and therefore the weight) of the product center of mass (107), are labeled. For clarity, the Product (105, FIGS. 1-2) itself has been omitted from view, the proportions being sufficient for its comprehension, in view of the hopper (500), which retains the product.

Instead of Pivot 1 and 2 (400 and 401 of FIG. 4A-B), FIG. 5 shows two supports (504 and 505) are supported by two Flexures, Flexure 1 (501) and Flexure 2 (502). A flexure is interesting type of pivot that only allows rotation about a single axis. In other words, a "flexure" may be defined as a hinge with no hysteresis.

A Scale (503) is located on the opposite support (506), similarly located to Scale 3 (303, FIGS. 3 and 4). The Scale (503) is one which does not resist translational movement in the X and Y plane. Referring to FIG. 5B, such scales have included a roller, generally a mechanical rolling device which allows the support (506) to translate relative to the face/compressible part of a scale. Forces which deflect the hopper in the X-Y plane simply cause the hopper (500) to translate laterally with respect to the scale (503), and so its movement does not cause the scale (503) to bind or bend or incur erroneous measurements of force (507) in the direction of intended resistance loading of the scale (503).

In a 3-scale suspended hopper of the prior art (such as FIG. 3A-B), the hopper is only located laterally (in the X-Y plane) by the three scales' (301, 302, 303, FIG. 3A) ability to resist rotation. Not every scale can use a roller, unless the hopper is otherwise constrained against slipping beyond the range of movement allowed on the roller, lest it be allowed to translate entirely off of the scale or out of functional alignment.

The present embodiment, however, for having Flexures 1 and 2 (501 and 502), it has several properties of a system that has two pivots (FIG. 4A-B). Instead of scales that must deflect, and so do not control translation nearly as well, is able to resist x-y plane deflections similarly to a two-pivot system, but additionally can resist deflections of the hopper (500) at either flexure. Because there are two pivots, rotation about the Z-axis is countered, as rotational movement at either of Pivot 1 or 2 is countered with a moment generated by the translative resistance of the other Pivot, in an amount proportional to the distance between the pivots. However, because the pivots in this case are flexures, which only allow rotation about a single axis, either of such pivots can also provide rotational resistance, even without the other, when arranged as in FIG. 5A, which places the axis of allowed rotation parallel to the X-Y plane.

The greater constraint against lateral motions allows embodiments similar to FIG. 5 to use simpler and cheaper alternatives for the Scale (503) to the ones robust enough to employ the rollers that afforded the isolation from the translation movements of hoppers in the prior art. The load limits were so high that many were hampered in their ability to deliver very high precision. Therefore, several contemplated embodiments are able to employ load cells that were not previously practicable for such duties, ones that are able to provide significantly higher precision but which lack the large maximum load tolerance of the scales that are presently viable to serve this purpose.

The embodiment of the present invention of FIGS. 5A-B also eliminates rotation about the X axis. Distinctly different from Scale 1 and 2 (FIGS. 3 and 4), Flexure 1 and 2 (101, 102) resist translation in the Z axis. By being countered against such vertical forces at two pivots, the hopper cannot even rotate about the X axis running through either "pivot." Also, because each of the "pivots" are flexures that are arranged to only allow rotation about the Y axis, each pivot can resist x-axis rotation of the system, acting independently. Therefore, the embodiment of FIG. 5 affords 2 more additional factors of rotation constraints about the vertical axis than does the embodiment shown in FIGS. 4A-B.

As a result of these constraints, lateral forces applied to the hopper (500) about the X axis do not contribute to movement of the product, and only X1 (111) and X2 (112) define the product center of mass. Therefore, the equations that describe this measurement, for the embodiment shown in FIG. 5A-B are:

$$\text{Product\_Weight} := \frac{X1 + X2}{X1} * \text{SCALE} \qquad \text{EQ 4.1}$$

Without a "Y" term in the equation, any actual movement of the product center of mass in the Y direction does not affect the measurements of weight force (507) actually taken at the Scale (503), and the measurements (which are taken in the Z-direction), will be accurate independent of any shift of the product center of mass (107) in the Y-direction. Compared to the standard three dimensional measurement method of FIGS. 4A-B, errors in measurement (in some embodiments) attributable to lateral movement of the product center of mass (107) are typically a full order of magnitude less.

I claim:

1. A weight measurement apparatus, comprising:
a vessel, three supports and a valve mechanism,
and wherein said vessel includes an upper receiving end and a lower dispensing end, said upper end of the vessel adapted to receive a flowable product and said lower end of the vessel adapted to controllingly dispense the product and wherein said vessel is suspended by three supports
and wherein one of said supports comprises a scale of the type which resists translation in only one direction, wherein the direction is vertically upward, one which does not resist translation in any lateral direction, and resists support with respect to the vessel, and
wherein two of said supports are pivot-supports, pivot-supports being supports which comprise pivots, said pivots resisting translation and arranged to resist forces applied to the vessel in a lateral direction,
wherein the apparatus is adapted to weigh the weight of the product received into the upper receiving end of the vessel with said scale, and
wherein the apparatus is assembled and arranged to exclude from measurements of the scale forces of the apparatus which are erroneous to accurate measurement of product flowing through the apparatus, and is adapted and arranged to apply a minimal number of additional loads upon the scale, apart from the product weight by means of the pivot-supports.

2. The apparatus of claim 1, wherein said scale comprises a button load cell.

3. The apparatus of claim 1, wherein the pivots comprise flexures, the apparatus thereby being assembled and arranged to allow the flexures to resist rotational moments about a vertical axis.

4. The apparatus of claim 1, wherein the pivot-supports define a horizontal axis of rotation and allowing rotation of the apparatus only about the horizontal axis, the apparatus being assembled and arranged to apply a minimal number of additional loads on the scale by locating the center of gravity of the valve mechanism in a vertical plane that passes through the horizontal axis, such that its weight does not create a moment about the horizontal axis.

5. The apparatus of claim 4, and further wherein the vessel is adapted to force the product centrally as it discharges from the vessel, the shape being one selected from a list comprising a funnel, a tapering-section collector, a nozzle, and a flowable materials hopper and narrowing-section gravity feed conveyor.

6. An apparatus, comprising:
a vessel, the vessel comprising an upper receiving end and a lower dispensing end, said upper end of the vessel adapted to receive a flowable product and said lower end of the vessel adapted to controllingly dispense the product and wherein said vessel is suspended by three supports, a mechanism for resistance to lateral-plane translation and a mechanism for weight measurements that is isolated from forces applied to the vessel in a lateral direction, and wherein the mechanism for resistance to lateral-plane translation comprises a pair of pivots by two of the supports of the vessel being pivot-supports, a pivot-support being a support that comprises a pivot, and
wherein the mechanism for weight measurements that is isolated from forces applied to the vessel in a lateral direction further comprises a scale-support, a scale support being a support which comprises a scale, and wherein the scale is one which resists translation only in a vertical direction, and
wherein the pivot-supports define a rotation axis that extends horizontally, and about which the pivot-supports do not provide resistance against rotation caused by vertical forces applied to the apparatus that are offset laterally from the axis, and further comprising a valve mechanism for regulating the flow of product out of the vessel, wherein the mechanism for weight measurements is isolated from valve mechanism by locating the valve mechanism such that its center of mass is arranged vertically with respect to the axis.

7. A suspended hopper apparatus adapted to dispense a flowable product, comprising:
three supports, a vessel, and a valve mechanism and
wherein said vessel includes an upper receiving end, a dispensing lower end and wherein the upper end is adapted to receive the product and said lower end adapted to controllingly dispense the product, wherein one of the three supports is a scale-support, and the other two supports are pivot-supports and wherein said vessel is adapted to contactingly rest upon said three supports, said scale-support being a support which comprises a scale, wherein the scale is of a type which resists translation in only one direction, and does not resist translation in any lateral direction, wherein the direction is vertically-upward, and resists by providing upward support with respect to the vessel, said pivot-supports being supports which comprise pivots, the pivots resisting translation and arranged to resist forces that are applied to the apparatus in a lateral direction, and being spaced apart from each other.

said pivots defining a common axis of rotation, the axis extending in a horizontal direction, the pivots not resisting rotation about the axis, said vessel having a vessel centerline that is offset laterally from the axis, the product having a product centerline that is offset laterally from the axis, and wherein the valve mechanism is arranged to not generate a moment about the axis by its center of mass being located in a vertical plane passing through the axis.

8. The apparatus of claim 7, and further comprising a scale-support axis, the scale-support axis being in the horizontal plane of the hopper supports, and it passes through the location at which the scale-support provides vertical support and the center of the axis of rotation, and the two pivot-supports are arranged on the side of the hopper which is opposite the scale-support, at equal degree of angular offset from the scale-support axis, wherein at least one of the pivots is a flexure that provides to the apparatus resistance to rotation about any axis that is parallel to the product centerline and provides to the apparatus resistance to rotation about any axis that is parallel to the scale-support axis.

* * * * *